Figure 1:
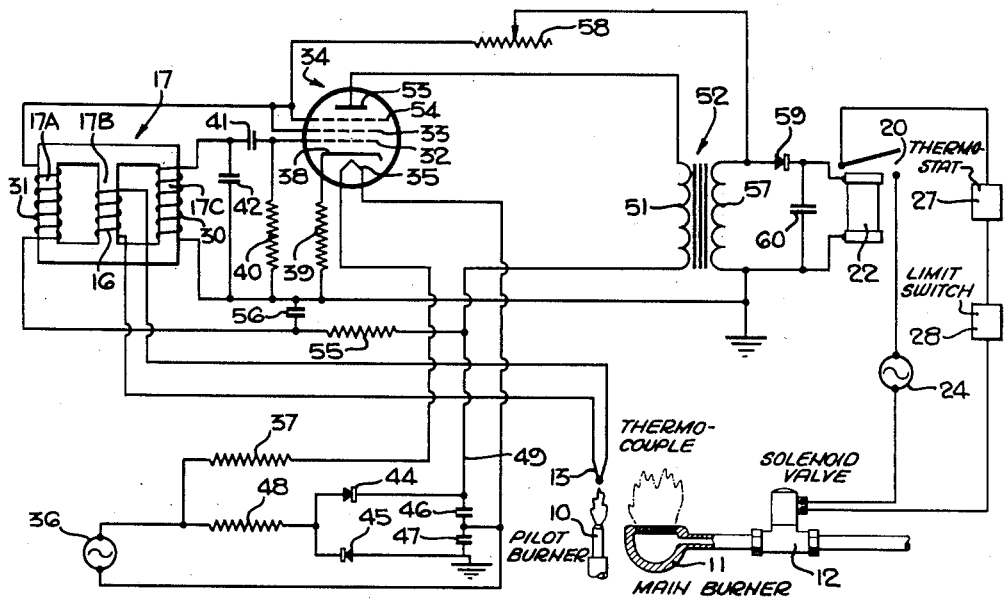

United States Patent Office 2,793,291
Patented May 21, 1957

2,793,291

CONTROL APPARATUS USING OSCILLATORY CIRCUITS

Donald J. O'Connell, Burbank, and William A. Ray, North Hollywood, Calif., assignors to General Controls Co., Glendale, Calif., a corporation of California Application July 8, 1950, Serial No. 172,762

5 Claims. (Cl. 250—36)

The present invention relates to improved control circuits of the type useful in, for example, but not necessarily limited to, safety arrangements whereby the flow of fuel to a main gas burner is prevented unless, first the associated pilot light is ignited.

In general, the present invention contemplates the use of an oscillatory circuit controlled in a novel manner in accordance with the heating of an associated thermocouple in a pilot burner flame. Such control circuit includes, as an important element thereof, a magnetic structure which has a control winding connected to the thermocouple for purposes of altering a characteristic of the magnetic structure to, in turn, control the amplitude or presence of oscillations in the oscillatory circuit. While such control winding is energized with current derived from the voltage generated by a thermocouple in or closely adjacent a pilot burner, the present invention in its broader aspects is, of course, not limited to the use of an associated thermocouple but may have applicability in other systems where a control voltage, derived by means other than a thermocouple, is available for purposes of effecting a control operation such as energization of an associated relay and closure of the relay contacts. As the description progresses it will be evident that the first circuit shown in the first figure and described herein operates on the principle that the oscillatory circuit is continuously in oscillation and that the amplitude of such oscillations increase when and as the amplitude of the control voltage derived from a heated thermocouple increases. On the other hand, the second circuit shown in the second figure and described herein operates on the principle that normally there are no oscillations generated in the circuit, but upon the occurrence of a control voltage above a predetermined threshold value, the circuit begins to produce oscillations of relatively high amplitude to effect closure of the contacts of a relay connected thereto.

In view of the fact that there are described herein arrangements whereby an oscillatory circuit may be controlled by direct current voltage to produce either continuous or discontinuous changes in the amplitude of oscillations in such circuit, it is thus understood that the term "control effect" as used herein in the specification and claims is sufficiently broad to include both such continuous and discontinuous changes in the amplitude of the oscillations in the circuit.

It is therefore one of the objects of the present invention to provide improved controls of this character operating on the principles indicated above.

One of the main objects of the present invention is to provide an improved control apparatus of this type whereby approximately 8 to 10 microwatts of power at a voltage level of a few millivolts direct current may serve to operate the contacts of an associated relay.

Another object of the present invention is to provide an improved control apparatus which incorporates a magnetic structure arranged to control either the presence or amplitude of oscillations produced in an associated oscillatory circuit.

Another object of the present invention is to provide an improved control apparatus of this type in which a small continuous voltage generated by a thermocouple is used to produce a control effect on an oscillatory circuit to, in turn, operate the contacts of an associated relay.

Another object of the present invention is to provide an improved control apparatus of this character which incorporates a magnetic structure controlled in accordance with voltage generated by a thermocouple to control the amplitude of oscillations in an associated oscillatory circuit, whereby relatively large voltages may be produced for operating relays and the like in accordance with small variations in thermocouple voltages.

Figure 2:
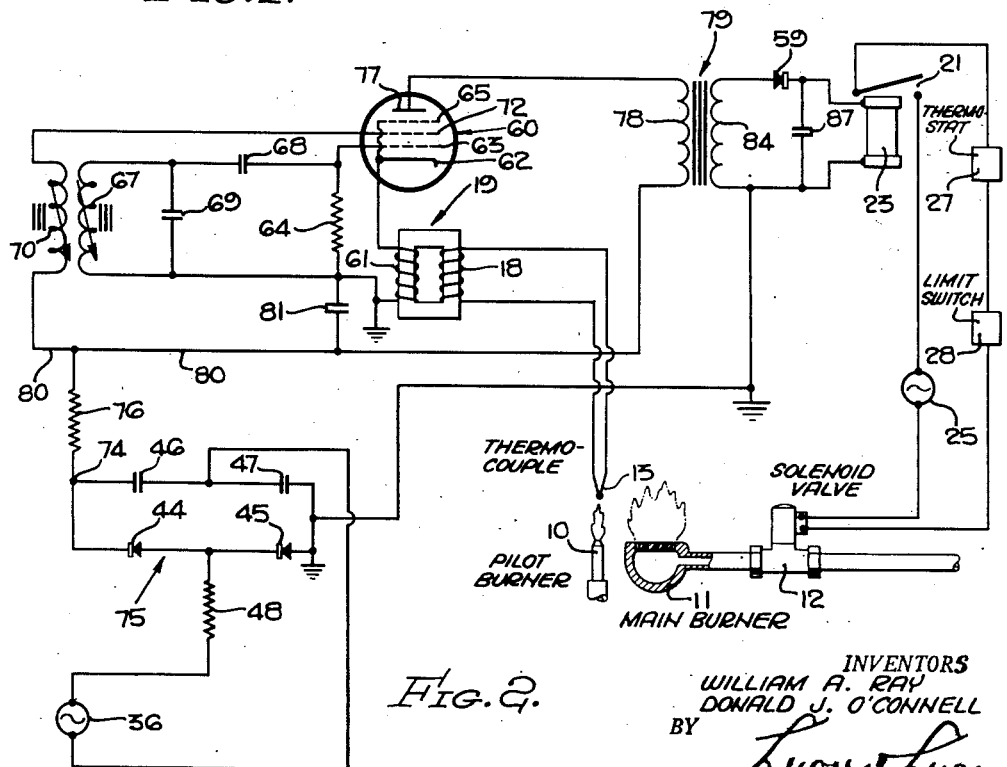

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a partly schematic and partly structural representation of apparatus embodying features of the present invention for achieving continuous variations in the amplitude of the oscillations in accordance with certain features of the present invention; and Figure 2 shows partly in schematic and partly in structural form apparatus embodying features of the present invention whereby the amplitude of oscillations in the oscillatory circuit is discontinuous in nature within the range of operation.

It is observed that the arrangements shown in Figures 1 and 2 are each associated with and include a pilot burner 10, a main burner 11 and solenoid valve 12 arranged to control the flow of gas to the main burner, the gas in the main burner being ignited by the flame of the pilot burner. Further, such pilot burner 10 has associated therewith a thermocouple 13 heated thereby, either by being immersed in the pilot burner flame or by radiation at a spaced distance from the burner.

In each of Figures 1 and 2 an oscillatory circuit capable of producing oscillations in the order of, for example, 12,000 cycles per second is controlled in accordance with the voltage generated by the thermocouple 13 and applied to a control winding of a magnetic structure.

In Figure 1 this control winding is designated as the winding 16 and the magnetic structure by the general reference numeral 17; and, in Figure 2 the control winding is designated by the reference numeral 18 and its associated magnetic structure by the reference numeral 19. In each case, when the corresponding control voltages applied to the respective windings 16, 18 exceed a predetermined threshold value, the relay switches 20, 21, respectively, associated with the corresponding relay windings 22, 23 are actuated to circuit closing position, to thereby allow the corresponding solenoid valve 12, 12 to be energized with current from the voltage source 24, 25. It is noted that these relay switches are connected in a serial circuit with switches in a thermostat 27 and limit switch 28.

Referring now exclusively to Figure 1, the control winding 16 encircles the middle, second or flux diverting leg 17B of a three-legged magnetic structure which has the first leg 17A, the second leg 17B and the third leg 17C. It is observed that this middle or second leg 17B is disposed in shunt or in parallel with respect to the other two legs, 17A, 17C and is thus used essentially as a means for diverting magnetic flux produced in either one of legs 17A, 17C from passing to the other one thereof. Each one of these legs 17C, 17A has a corresponding alternating current winding 30, 31 thereon connected respectively to the main control grid 32 and screen grid 33 of an electron discharge device 34.

The discharge device 34, of the pentode type, has its heater 35 supplied with cathode heating current from opposite terminals of the voltage source 36 through the serially connected voltage dropping resistance 37. The cathode 38 is grounded through the bias resistance 39, and the control grid 32 is connected through resistance 40 to provide a path for the flow of direct current between the grid and cathode. One terminal of the winding 30 is grounded, and its other terminal is connected to the grid 32 through the coupling condenser 41. The condenser 42 is connected in shunt with the winding 30 and serves to tune the grid input circuit in which it is thus connected.

Space current for discharge device 34 is supplied from the voltage source 36 after being rectified by the rectifiers 44 and 45 and filtered by the filter condensers 46, 47. It is observed that the rectifiers 44 and 45 are connected to the source 36 through resistance 48 as a full wave rectifier with the high voltage positive lead 49, connected at the junction point of rectifier 44 and condenser 46, being connected through the primary winding 51 of transformer 52 to the anode 53. The junction point of rectifier 45 and condenser 47 is grounded so that space current may flow from the positive high voltage lead 49 through the winding 51 to the anode 53, to the cathode 38 and resistance 39 to ground. The screen electrode 33 is connected to the high voltage lead 49 through the voltage dropping resistance 55 and winding 31 so that a flow of screen space current may flow from such positive lead 49 through the resistance 55 through the winding 31, to the screen electrode 33 to the cathode 38 and then returned to ground through the cathode resistance 39. Bypass condenser 56 has one of its terminals grounded and the other one of its terminals connected between the junction point of winding 31 and resistance 55. Similarly, the heater 35 may be bypassed to ground by connecting one of the terminals of such heater 35 to the junction point of filter condensers 46 and 47.

Condenser 42 connected across the grid winding 30 serves not only to tune such winding but also serves to establish the "phase" of the alternating current voltage applied to the grid 32, so that energy fed back to the grid circuit from the screen, i. e., through the magnetic structure 17, is in proper phase for generating sustained oscillations, the amplitude of which, however, is controlled by the continuous current flowing in winding 16.

The discharge device 34 may be of the 12SJ7 or 12AU6 type. This tube is normally used as a pentode with a suppressor grid, i. e., the grid adjacent the anode connected to its cathode; but in this instance the suppressor grid 54 is connected to its cathode 35 through a serial circuit comprising the adjustable resistance 58, the secondary winding 57 of transformer 52 and the cathode resistance 39, it being observed that the junction point of winding 57 and resistance 39 is grounded.

This secondary winding 57 has its ungrounded terminal connected through the rectifier 59 to the ungrounded terminal of the direct current relay 22; and the terminals of such relay are shunted by the condenser 60 for producing a desired time delay to avoid spurious operation of the relay switch 20 which might otherwise be produced by transients, for example, by variations in the voltage of source 36.

Normally, in the absence of any direct current voltage applied to the control winding 16, there is sufficient negative feedback from the screen grid circuit including the winding 31 to the control circuit including the winding 30 to sustain the generation of oscillatory currents of relatively low magnitude in the anode circuit which includes the primary winding 51. Such oscillation currents in the anode circuit, under this condition, are of insufficient intensity to cause actuation of the relay switch 20, such oscillation current being of relatively small magnitude since voltages applied to the control grid 32 and screen grid 33 are sufficiently out of phase, i. e., the oscillatory voltages appearing respectively on the control grid and screen have their maximum positive values occurring at different times. The more near the screen and grid voltages are in phase, the greater the amplitude of oscillation current in the primary winding 51.

The screen and grid voltages are brought closer to an in phase condition by increasing the amount of direct current flowing through the control winding 16. This current through the control winding 16 is, of course, produced by the voltage generated by the thermocouple which is heated by the pilot burner flame. Thus, upon heating of the thermocouple 13 the phase of the voltage appearing on the screen and control grids approach an in phase condition to produce a resulting large oscillatory current flow through the primary winding 51, such current flow being of sufficient intensity to develop a voltage across the terminals of relay winding 22 to produce actuation of its switch 20.

It is observed that the relatively high oscillatory voltage which appears across the secondary winding 57, when the thermocouple 13 is heated, is applied between the cathode 38 and the suppressor grid 55, such voltage being of such polarity and intensity to produce a cumulative effect in the generation of oscillation with larger amplitude, i. e., if the voltage appearing across the secondary winding 57 were not applied to the suppressor grid 54, then such voltage would be of smaller magnitude. By the same token, when the direct current voltage applied to the control winding 16 is decreased, as for example, upon extinguishment of the pilot burner flame, the magnitude of the voltage appearing across the secondary winding 57 decreases cumulatively at a relatively high rate, i. e., the recovery period is minimized. In other words, upon extinguishment of the pilot burner flame, the voltage across the secondary winding 57 decreases not only because the grid and screen voltages assume their original out of phase condition, but also because the feedback voltage applied to the suppressor grid is decreased.

In the arrangement shown in Figure 2 the electron discharge device 60 shown therein is normally biased, in the absence of a pilot burner flame, in a non-oscillating condition. However, when the thermocouple 13, in proximity to the pilot burner flame is heated by such flame, oscillations of sufficient amplitude are generated to produce operation of the single pole double throw relay switch 21 associated with the winding 23.

In order to achieve this non-oscillatory condition, a magnetic structure of relatively large impedance, in the form of the alternating current winding 61 of the saturable reactor 19, is connected in the cathode return lead. It is observed that the winding 61 is connected in the cathode-grid circuit of the discharge device 60. Specifically, one terminal of the winding 61 is connected to the cathode 62, while the other terminal of such winding is grounded; and, the control grid 63 is connected to ground through the resistor 64. The suppressor grid 65 is connected to the cathode. Also, the control grid 63 is connected to the ungrounded terminal of the slug tuned transformer winding 67 through the coupling condenser 68, such winding 67 being tuned by the condenser 69.

Feedback to sustain oscillations is introduced through such winding 67 from the winding 70, which has one of its terminals connected to the screen grid 72 and the other one of its terminals connected through lead 80 to the high continuous voltage terminal 74 of the full wave rectifier 75 through the voltage dropping resistor 76.

The anode 77 is connected through the primary winding 78 of the output transformer 79 to the high voltage lead 80. Bypass condenser 81 may be connected from the high continuous voltage lead 80 to ground, such condenser 81 cooperating with the resistance 76 through which it is charged to serve also as a storage for electrical energy to prevent spurious operation of the circuit when, for example, there are fluctuations in the voltage of the source 36. To achieve this condition the time constant of the series circuit comprising resistance 76 and condenser 81 may, for example, be one tenth of a second.

The operation of the circuit shown in Figure 2 is as follows, in the absence of a pilot burner flame, the saturable reactor winding 61 presents sufficient impedance in the grid-cathode circuit of the device to prevent oscillations. However, when the thermocouple 13 is heated by the pilot burner flame the impedance of the saturable reactor winding 61 is materially decreased by the resulting continuous current flowing through the control winding 18 to thereby decrease the bias voltage between the grid and cathode, whereupon the discharge device 60 starts to oscillate with feedback voltage being transferred from the screen grid 72 to the control grid 63 through the inductively coupled windings 70 and 67. The resulting oscillatory voltage appearing across the secondary winding 84 is rectified by the rectifier 59 so that a continuous current of sufficient intensity flows through the relay winding 23 to effect energization of its associated switch 21.

A condenser 87 may be connected in shunt with the relay windings 22, 23, Figures 1 and 2, to prevent spurious operation of such relays, which otherwise might occur due to transient voltages in the systems, for example, voltage fluctuations in source 36.

Thus, while the circuit shown in Figure 1 depends in its operation mostly on variations of the phase difference between oscillatory voltages appearing on the screen electrode 33 and grid 32 (such variation being accomplished by use of the magnetic structure 17), the circuit shown in Figure 2 depends, in its operation, mostly on the intensity of the feedback voltage transferred through the transformer 70, 67, any phase shift between the grid and screen voltages being secondary.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In apparatus of the character described, the combination comprising, a thermocouple heated by a flame, an oscillatory circuit including an electron discharge device for developing oscillations of variable intensity, said discharge device having an output electrode, a control grid and a cathode, said oscillatory circuit including circuitry for supplying a feedback voltage in proper phase to said control grid to sustain said oscillations, said circuitry including a magnetic structure having an alternating current winding of variable inductance thereon connected between said cathode and said control grid, said magnetic structure having a continuous current winding mounted thereon, said continuous current winding being connected to said thermocouple and energized in accordance with voltage generated in said thermocouple to change the inductance of said alternating current winding and shift the phase of said voltage to thereby change the intensity of oscillations in said device, a voltage responsive utilization device operated when the voltage applied thereto exceeds a predetermined value, and means coupling said output electrode to said voltage responsive utilization device to control operation thereof in accordance with the heated condition of said thermocouple.

2. In apparatus of the character described, the combination comprising thermoelectric means heated by a flame, an oscillatory circuit including an electron discharge device, said discharge device having a screen electrode, an output electrode, a control grid and a cathode, a magnetic structure comprising a flux diverting transformer and having a winding for the flow of oscillatory current therethrough connected between said control grid and said cathode, said magnetic structure having a second winding for the flow of oscillatory current therethrough connected between said screen electrode and said cathode to effect feedback from said second winding to the first-mentioned winding, said magnetic structure having a continuous current winding thereon connected to said thermoelectric means and arranged to control the relative phase between the voltage on said screen electrode with respect to the voltage on said control grid in accordance with the heated condition of said thermoelectric means to control the amount of energy transferred between said screen electrode and said control grid to thereby change the amplitude of oscillations in said oscillatory circuit without appreciably changing the frequency of said oscillations, a voltage responsive utilization device operated when the voltage applied thereto exceeds a predetermined value, and means coupling said output electrode to said utilization device to control the operation thereof in accordance with the heated condition of the thermoelectric means.

3. In apparatus of the character described, the combination comprising thermoelectric means heated by a flame, an oscillatory circuit including an electron discharge device, said discharge device having a screen electrode, an output electrode, a suppressor grid, a control grid and a cathode, a magnetic structure comprising a flux diverting transformer and having a first winding for the flow of oscillatory current therethrough connected between said control grid and said cathode, said magnetic structure having a second winding for the flow of oscillatory current therethrough connected between said screen electrode and said cathode to effect feedback from said second winding to the first mentioned winding, said magnetic structure having a continuous current winding thereon connected to said thermoelectric means and arranged to control the relative phase between the voltage on said screen electrode with respect to the voltage on said control grid in accordance with the heated condition of said thermoelectric means to control the amount of energy transferred from said screen electrode to said control grid to thereby change the amplitude of said oscillatory current without appreciably changing the frequency of said oscillatory current, a voltage responsive utilization device operated when the voltage applied thereto exceeds a predetermined value, means coupling said output electrode to said voltage responsive utilization device to control the operation thereof in accordance with the heated condition of the thermoelectric means, and means coupling said suppressor grid to the last mentioned coupling means whereby a portion of the oscillatory voltage developed on said output electrode is applied to said suppressor grid.

4. In apparatus of the character described, the combination comprising thermoelectric means heated by a flame, an oscillatory circuit including an electron discharge device, said electron discharge device having a screen electrode, an output electrode, a control grid and a cathode, a saturable reactor having a first winding connected between said control grid and said cathode, said saturable reactor having a second continuous current winding thereon connected to said thermoelectric means to control the amplitude of oscillations in said oscillatory circuit in accordance with the voltage developed in said thermoelectric means without appreciably changing the frequency of said oscillations, a transformer, means including said transformer arranged to couple said screen electrode to said control grid for the production of oscillations in said device, a voltage responsive utilization device operated when the voltage applied thereto exceeds a predetermined value, and means coupling said output electrode to said utilization device to control its operation in accordance with heating of said thermoelectric means.

5. In apparatus of the character described, the combination comprising thermoelectric means heated by a flame, an oscillatory circuit including an electron discharge device, said electron discharge device having an output electrode, a control grid, an auxiliary electrode, and a cathode, a magnetic structure having a first winding connected between said control grid and said cathode, oscillatory voltage feedback means coupling said control grid to said auxiliary electrode for the production of oscillations in said device, said structure having a continuous current winding thereon connected to said thermoelectric means for controlling the amount of energy transferred from said auxiliary electrode to said control grid to thereby change the amplitude of oscillations in said oscillatory circuit without appreciably changing the frequency of said oscillations, a voltage responsive utilization device operated when the voltage applied thereto exceeds a predetermined value, and means coupling said output electrode to said utilization device to control its operation in accordance with heating of said thermoelectric means.

References Cited in the file of this patent

UNITED STATES PATENTS

| | | |
|---|---|---|
| 2,007,714 | Gauger | July 9, 1935 |
| 2,085,195 | Kerr | June 29, 1937 |
| 2,111,086 | Basim | Mar. 15, 1938 |
| 2,142,059 | Kuempel | Dec. 27, 1938 |
| 2,150,440 | Hargreaves | Mar. 14, 1939 |
| 2,225,700 | Laing | Dec. 24, 1940 |
| 2,228,163 | Cohen | Jan. 7, 1941 |
| 2,228,997 | Sparrow | Jan. 14, 1941 |
| 2,313,917 | Brownlee | Mar. 16, 1943 |
| 2,327,690 | Ackerman | Aug. 24, 1943 |
| 2,369,953 | Downey | Feb. 20, 1945 |
| 2,370,818 | Silverman | Mar. 6, 1945 |
| 2,385,530 | Paille | Sept. 25, 1945 |
| 2,414,314 | Machlet | Jan. 14, 1947 |
| 2,415,189 | Pell | Feb. 4, 1947 |
| 2,542,638 | Desch | Feb. 20, 1951 |
| 2,546,784 | Roggenstein | Mar. 27, 1951 |
| 2,554,124 | Salmont | May 22, 1951 |
| 2,557,168 | Arps | June 19, 1951 |
| 2,586,686 | Medlock | Feb. 19, 1952 |
| 2,590,826 | Schenck | Mar. 25, 1952 |

OTHER REFERENCES

Radio Engineers Handbook, Terman, 1st Edition, pages 480 through 488, and 549, 550.